(12) United States Patent
Griffin et al.

(10) Patent No.: US 6,543,333 B2
(45) Date of Patent: Apr. 8, 2003

(54) ENRICHED COBALT-TIN SWASHPLATE COATING ALLOY

(75) Inventors: William J. Griffin, Prospect, CT (US); Ram Ramamurthy, Canton, MI (US); Carl Edward Cordy, Greenfield, IN (US)

(73) Assignee: Visteon Global Technologies, Inc., Dearborn, MI (US)

( * ) Notice: Subject to any disclaimer, the term of this patent is extended or adjusted under 35 U.S.C. 154(b) by 11 days.

(21) Appl. No.: 09/873,147

(22) Filed: Jun. 1, 2001

(65) Prior Publication Data

US 2002/0178905 A1 Dec. 5, 2002

(51) Int. Cl.$^7$ .............................. F01B 3/00; F04B 27/10
(52) U.S. Cl. ......................................... 92/71; 29/888.02
(58) Field of Search ..................... 92/71, 155; 74/60; 29/888.02

(56) References Cited

U.S. PATENT DOCUMENTS

| | | | |
|---|---|---|---|
| 1,101,220 A | 6/1914 | Tebbetts | |
| 1,443,870 A | 1/1923 | McArthur et al. | |
| 1,654,509 A | 12/1927 | Claus | |
| 2,022,917 A | 12/1935 | Larkin et al. | |

(List continued on next page.)

FOREIGN PATENT DOCUMENTS

| AT | 1577557 | 10/1980 |
|---|---|---|
| DE | 3147226 A1 | 11/1981 |
| DE | 3447 194 A1 | 7/1986 |
| EP | 0 024 507 A1 | 6/1980 |
| EP | 0 218 274 A1 | 8/1986 |
| EP | 0 244 396 | 4/1987 |
| EP | 0 244 619 | 6/1987 |
| EP | 0 713 972 A1 | 5/1996 |
| EP | 0 776 986 A1 | 6/1997 |
| EP | 0 854 286 A2 | 7/1998 |
| EP | 0 890 743 A2 | 1/1999 |
| EP | 0 911 517 A2 | 4/1999 |
| EP | 0 926 340 A2 | 6/1999 |
| EP | 0 992 683 A1 | 4/2000 |
| EP | 1 106 704 A1 | 6/2001 |
| EP | 1 116 881 A1 | 7/2001 |
| EP | 1 118 768 A1 | 7/2001 |
| GB | 1461371 | 1/1977 |
| JP | SHO 60-22080 | 2/1985 |
| JP | 60022080 | 2/1985 |
| JP | WO99/19625 | 4/1999 |
| JP | WO99/50556 | 10/1999 |
| JP | WO99/50557 | 10/1999 |
| JP | WO01/04492 A1 | 1/2001 |

*Primary Examiner*—Edward K. Look
*Assistant Examiner*—Thomas E. Lazo
(74) *Attorney, Agent, or Firm*—Brinks Hofer Gilson & Lione

(57) ABSTRACT

A swashplate type compressor having a swashplate coated with a tin-cobalt alloy is provided. The alloy comprises between about 12 and 28 weight % cobalt, with the balance substantially comprising tin. The swashplate may further include an intermediate layer of about 100 weight % tin underneath the tin-cobalt alloy layer. Methods of coating a swashplate with the coatings according to the present invention are also provided.

20 Claims, 2 Drawing Sheets

U.S. PATENT DOCUMENTS

| | | |
|---|---|---|
| 2,741,018 A | 4/1956 | Schaefer |
| 2,766,195 A | 10/1956 | Combs et al. |
| 3,669,719 A | 6/1972 | Doede et al. |
| 3,947,607 A | 3/1976 | Gazzard et al. |
| 4,037,522 A | 7/1977 | Inoshita et al. |
| 4,244,679 A | 1/1981 | Nakayama et al. |
| 4,263,814 A | 4/1981 | Takaoka et al. |
| 4,285,640 A | 8/1981 | Mukai |
| 4,363,854 A | 12/1982 | Hodes et al. |
| 4,435,482 A | 3/1984 | Futamura et al. |
| 4,503,179 A | 3/1985 | Yoshimura et al. |
| 4,562,122 A | 12/1985 | Hodes et al. |
| 4,573,878 A | 3/1986 | Ohno et al. |
| 4,591,536 A | 5/1986 | Hodes et al. |
| 4,662,267 A | 5/1987 | Kaku et al. |
| 4,666,787 A | 5/1987 | Bickle et al. |
| 4,723,572 A | 2/1988 | Tuymer |
| 4,790,727 A | 12/1988 | Steele |
| 4,795,682 A | 1/1989 | Turner et al. |
| 4,830,933 A | 5/1989 | Hodes et al. |
| 4,935,056 A | 6/1990 | Miyasaka |
| 5,056,417 A | 10/1991 | Kato et al. |
| 5,087,529 A | 2/1992 | Engel et al. |
| 5,116,692 A | 5/1992 | Mori et al. |
| 5,167,726 A | 12/1992 | Loiacono et al. |
| 5,242,657 A | 9/1993 | Sahu |
| 5,286,444 A | 2/1994 | Tomikawa et al. |
| 5,330,712 A | 7/1994 | Singh |
| 5,413,756 A | 5/1995 | Sahu |
| 5,445,896 A | 8/1995 | Tanaka et al. |
| 5,468,130 A | 11/1995 | Yamada et al. |
| 5,655,432 A | 8/1997 | Wilkosz et al. |
| 5,712,049 A | 1/1998 | Huhn et al. |
| 5,864,745 A | 1/1999 | Kawagoe et al. |
| 5,875,702 A | 3/1999 | Kawagoe et al. |
| 5,911,809 A | 6/1999 | Cordy ............ 92/71 |
| 5,938,864 A | 8/1999 | Tomikawa et al. |
| 5,943,941 A | 8/1999 | Kato et al. |
| 5,996,467 A | 12/1999 | Churgay et al. |
| 6,123,009 A | 9/2000 | Kanayama et al. |
| 6,136,454 A  * | 10/2000 | Cordy ............ 428/646 |
| 6,189,434 B1 | 2/2001 | Kawaguchi et al. |
| 6,192,784 B1 | 2/2001 | Kato et al. |

* cited by examiner

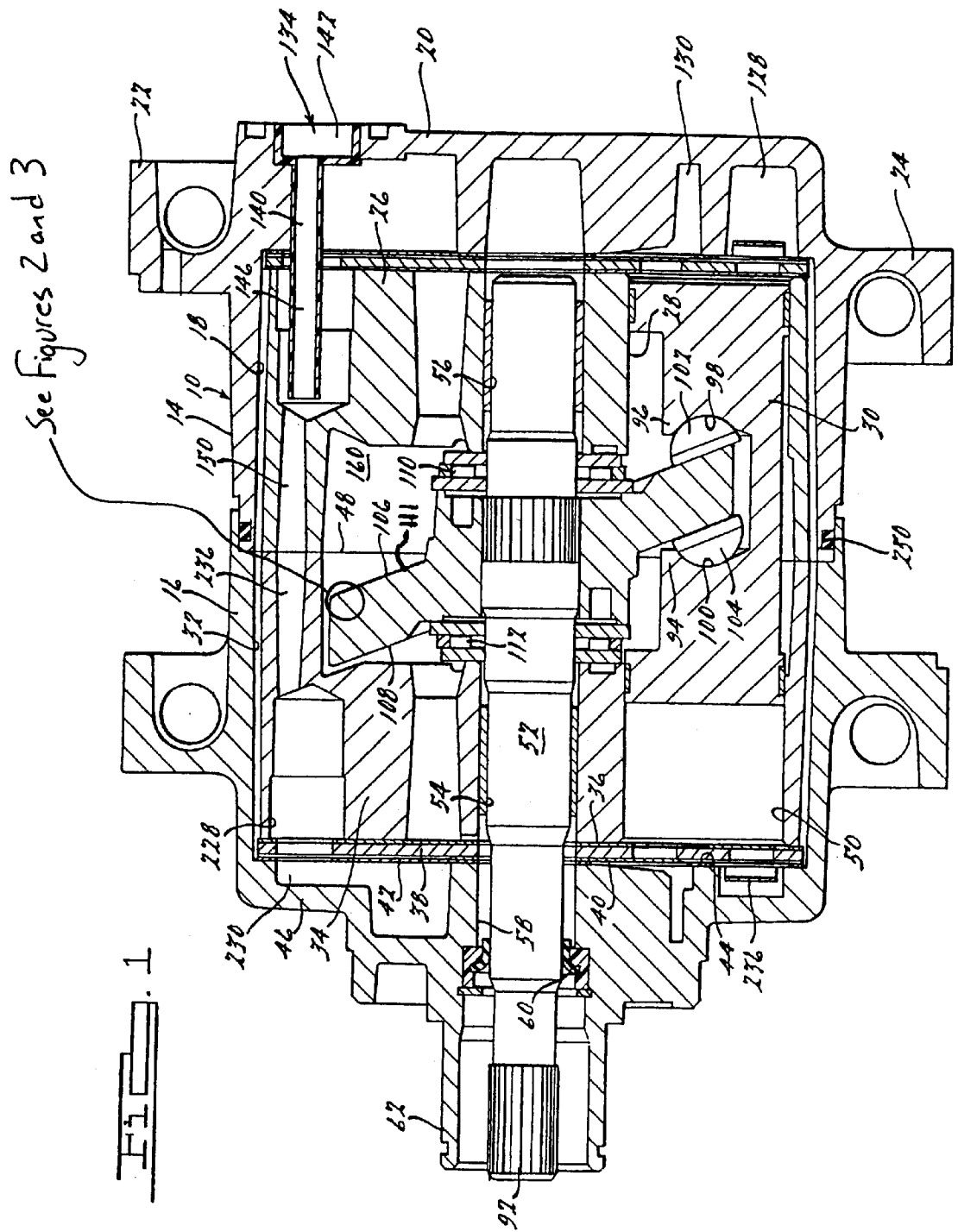

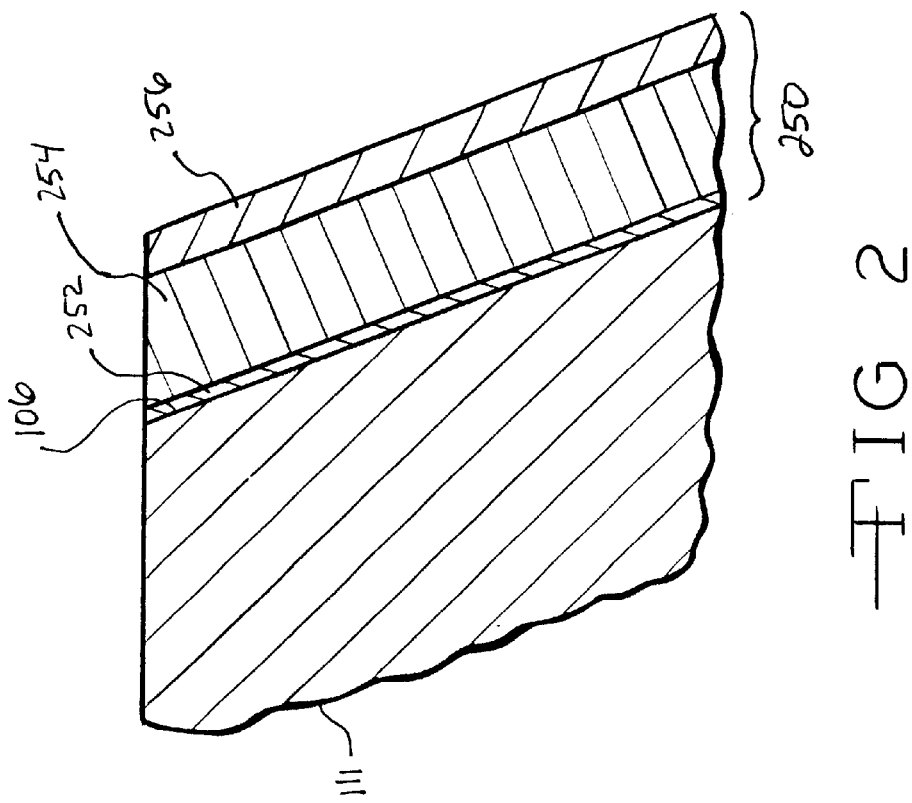
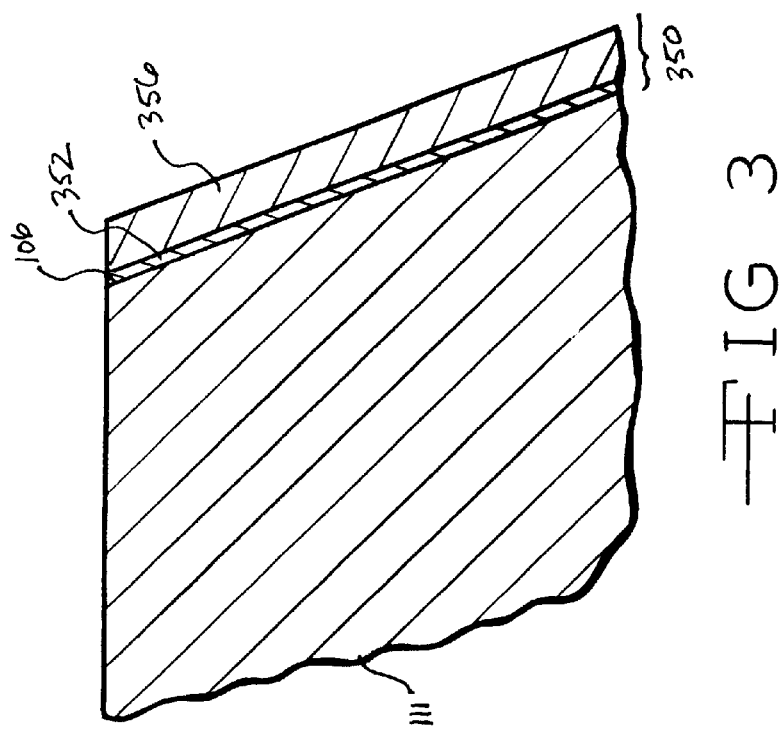

ENRICHED COBALT-TIN SWASHPLATE COATING ALLOY

FIELD OF THE INVENTION

The present invention relates to a swashplate type compressor for compressing a gas. More specifically, the present invention relates to an enriched cobalt—tin coating alloy that is particularly well suited for providing a coating surface on an aluminum or aluminum alloy swashplate of such a compressor. The present invention also provides a method of coating a swashplate with an enriched cobalt—tin coating alloy.

BACKGROUND OF THE INVENTION

Swashplate type compressors are frequently used in refrigeration circuits such as those used in automotive applications. These compressors operate through an engagement between one or more pistons and a swashplate. Rotation of the swashplate; which is oriented at an angle to the axis of rotation of a drive shaft, causes the engaged pistons to reciprocate within individual cylinder bores. This reciprocation allows the pistons to compress the refrigerant as part of the mechanical refrigeration process.

A pair of shoes are disposed between each piston and swashplate and swivel within concave pockets as the swashplate rotates. The interface between the shoes and swashplate is an area of sliding contact, giving rise to friction and wear. Over time, wear can lead to seizure of the compressor, especially in conditions in which lubricant supply to the swashplate is inadequate. This failure mode is one principal limitation on the useful life of a swashplate type compressor. Problems of maintaining low friction sliding contact between the shoes and swashplate are especially challenging for swashplates made of aluminum and aluminum alloys, because these materials are relatively soft, yet have abrasive qualities.

SUMMARY OF THE INVENTION

The present invention provides a swashplate-type compressor having a coating disposed on the aluminum or aluminum alloy swashplate. The coating preferably comprises a multi-layered structure on the surface of the swashplate substrate. Preferably, the coating is placed on the substrate in at least the areas that come into contact with the shoes. In a preferred embodiment, a base layer of tin is disposed on the substrate, and a layer of cobalt-tin is disposed on the tin layer. The cobalt-tin layer comprises between 12 and 28 weight % cobalt, with the balance comprising tin. In a preferred embodiment, the cobalt-tin layer comprises about 22 weight % cobalt, with the balance comprising tin.

The present invention provides a high weight percentage of cobalt in the surface coating layer. These layers can be deposited by chemical or electroplating deposition processes. However, electroplating is preferred since it allows for the achievement of higher cobalt concentrations, which improves the seizure resistance of the swashplate and compressor.

Electroplating deposition processes, when used in connection with this invention, also allows for the elimination of a second polishing step normally required for chemical deposition, commonly referred to as "superfinishing". This step is normally required to achieve a desired chemically reactive surface of the swashplate and is done immediately prior to chemical coating. The enriched-cobalt-tin alloy according to the present invention provides a desirable coating that can be electroplated onto a machined surface. Such surfaces can be obtained in a single machining operation, and thus superfinishing can be eliminated. Consequently, the coating alloy and method of the present invention when applied by electroplating offers significant time and expense savings over coatings deposited by chemical conversion techniques.

BRIEF DESCRIPTION OF THE DRAWINGS

FIG. 1 is a cross-sectional view of a swashplate type compressor of the type which may incorporate a swashplate coating in accordance with the present invention.

FIG. 2 is an enlarged view of a portion of the swashplate shown in FIG. 1 incorporating a first preferred embodiment of the present invention.

FIG. 3 is an enlarged view of a portion of the swashplate shown in FIG. 1 incorporating a second preferred embodiment of the present invention.

DETAILED DESCRIPTION OF THE INVENTION

The following description of the preferred embodiments of the invention provides examples of the present invention. The embodiments discussed herein are merely exemplary in nature, and are not intended to limit the scope of the invention in any manner. Rather, the description of these preferred embodiments serves to enable a person of ordinary skill in the relevant art to make and use the present invention.

FIG. 1 illustrates a swashplate type compressor that incorporates the swashplate coating of the present invention. The compressor includes a housing 10 which includes a rear housing part 14 and a front housing part 16, each of which is formed of die cast aluminum alloy. Housing part 14 has a cylindrical interior 18 and an integral end wall 20 that forms a part of the die casting. Mounting bosses 22 and 24 are formed as part of the die casting, and mounting bolts are received in bolt openings formed in the bosses 22 and 24.

A die cast aluminum cylinder body 26, in which is formed a plurality of cylinder openings, is itself of cylindrical shape and is fitted within the opening 18 with a very small clearance between the inner diameter of the cylindrical opening 26 of the housing 14 and the outer diameter of the cylinder body 26.

One of the cylinder openings in the cylinder body 26 is shown at 28. A compressor piston 30 is slidably received in the cylinder opening 28.

The front compressor head comprises the companion housing part 16. Like the housing part 14, housing part 16 has a circular central opening as seen at 32. A cylinder body 34, which itself is of cylindrical shape, is received in the cylindrical opening 32 with a minimum clearance between its outer diameter and the inside diameter of the cylindrical opening 32.

An inlet valve plate in the form of a circular spring steel disc is identified by reference numeral 36. Adjacent the disc 36 is a front valve plate 38, which has formed in it valve openings that are registered with reed valve elements of the inlet valve disc 36.

A front discharge valve plate 40 is located directly adjacent valve plate 38. It is formed with reed valve elements that register with valve openings formed in valve plate 38.

A front gasket plate 42 is disposed between the front discharge valve plate 40 and the end surface 44 of the opening 32 formed in the housing part 16. Surface 44 is a machined surface on the inner face of the end wall 46 of the housing part 16.

The cylinder block 30 is assembled in abutting relationship with respect to the cylinder block 34, the abutting surfaces being identified by common reference numeral 48. As seen in the figure, cylinder opening 28 is aligned with cylinder opening 50 in cylinder block 34 thus forming a common cylinder for the reciprocating piston 30.

A swashplate shaft 52 is journalled by bushing 54 in cylinder block 34 and by bushing 56 in cylinder block 26. Shaft 52 extends through end plate opening 58 in the end plate 46. A fluid seal 60 seals the interior of the housing as the shaft 52 rotates in shaft opening 58.

The piston 30 comprises two juxtaposed bosses 94 and 96, which are machined to provide semi-spherical pocket recesses 98 and 100 for swashplate shoes 102 and 104, respectively. The shoes 102 and 104 are provided with a flat bearing surface that slidably engage surfaces 106 and 108, respectively, on the swashplate 111 and shaft assembly.

The swashplate 111 is disposed at an angle relative to the axis of the shaft 52. As the shaft 52 rotates, the swashplate 111, due to the sliding engagement with the shoes 102, 104, causes the piston 30 to reciprocate in the cylinder defined by cylindrical openings 28 and 50 in the cylinder blocks 26 and 34, respectively. Thrust forces on the swashplate are accommodated by the radial needle bearing assemblies 110 and 112, which respectively engage the cylinder blocks 26 and 34 whereby the thrust on the swashplate hub is absorbed by the cylinder blocks.

The swashplate 111 is preferably fabricated from aluminum or an aluminum alloy material. Suitable aluminum alloys for use in the swashplate include aluminum-high-silicon type alloy, aluminum-silicon magnesium type alloy, aluminum-silicon-copper-magnesium type alloy, and aluminum alloys containing no silicon.

The shoes 102, 104 are preferably formed of sintered metal, and the flat bearing surfaces are porous enough to carry a lubricating oil film, thus establishing a nonabrasive sliding bearing relationship with respect to the surfaces 106 and 108 as the pistons are reciprocated. Each surface 106, 108 has a sliding region which comprises a circular region on the surface 106, 108 that encounters one shoe 102,104 during rotation of the swashplate 111.

The piston 30 is formed of a unitary die casting and is a double acting piston having dual compression heads. The piston 30 may also be of the single acting type.

The rear housing part wall 20 of the housing part 14 has inlet and outlet pressure cavities that are formed in it during the die casting operation. The low pressure inlet cavity 128 encircles the shaft 52. It is separated from the high pressure passage 130. The outlet port, which is a high pressure discharge port, is shown at reference numeral 134. Located in the outlet opening 134 is a pulsation damper tube or muffler, preferably made of plastic material. This is indicated in FIG. 1 by reference numeral 140. It includes a cylindrical end piece 142 received in the discharge opening 134. It includes also a reduced diameter extension 146 that is received in the high pressure cavity 130.

When high pressure discharge gases are distributed to the discharge port 150 of the cylinder block 26, those gases pass into the discharge passage 130 formed in the die cast end plate of the housing part 14. But before they can be transferred to the discharge opening 134 they must reverse in their directional flow toward the left hand opening of the extension 146 of the damper 140. The flow passage in the extension 146 is of less area than the flow area of the opening 134. This circuitous flow path for the discharge gases results in a dampening of undesirable pressure pulsations in the delivery of the refrigerant.

Referring now to FIG. 2, a coating 250 is disposed on at least a portion of at least one face surface 106, 108 of the swashplate 111. Preferably, the coating 250 is disposed on a portion of each face surface 106, 108. More preferably, the coating 250 is disposed on the sliding region of each face surface 106, 108. Thus, the coating 250 is preferably disposed on those portions of the swashplate 111 having slidable contact with shoes 102, 104.

As best illustrated in FIG. 2, the coating 250 according to a first preferred embodiment of the present invention comprises a multilayered structure. In this embodiment, the coating 250 comprises at least two layers disposed on the swashplate 111. The swashplate surface 106, 108 is protected with a base layer 252. Accordingly, a protectant zinc layer 252 is preferably disposed on the swashplate 111. An intermediate layer 254 is disposed on the protectant layer 252. Lastly, an alloy layer 256 is disposed on the intermediate layer 254. It should be understood that the swashplate is the composite of the underlying substrate and the coating. Element 111 refers not to the swashplate in its entirety, but rather the substrate or body of the swashplate.

The protectant layer 252 preferably comprises a layer of zinc. Also preferable, the protectant layer 252 has a thickness of between about 0.05 and 0.15 microns. Particularly preferably, the protectant layer 252 has a thickness of about 0.1 micron.

As with the entire coating 250, the intermediate layer 254 is preferably disposed on at least a portion of each face surface 106, 108. More preferably, the intermediate layer 254 is disposed on the sliding region of each face surface 106, 108. Alternatively, the intermediate layer 254 may be disposed over the entire swashplate 111, or may even be disposed on only one of the face surfaces 106, 108 of the swashplate 111.

The intermediate layer 254 preferably comprises a layer of 100 weight % tin. Of course, the intermediate layer may contain a relatively small weight % of contaminants that enter the layer 254 during the manufacturing process. For example, the intermediate layer 254 may include about 0.1 weight % zinc due to the use of zinc as a protectant during the manufacturing process.

The intermediate layer 254 is preferably composed of bright acid tin. Bright acid tin provides a crystalline structure that confers some hardness onto the tin without overcoming the desired soft characteristics of tin relative to other metals. Bright acid tin typically includes a small weight % of brighteners, and these may, therefore, also be present in the intermediate layer 254.

The intermediate layer 254 preferably has a thickness of between about 1.7 and 3.2 microns. Particularly preferably, the intermediate layer 254 has a thickness of about 2 microns.

The coating 250 according to the first preferred embodiment of the invention also includes an alloy layer 256 on top of the intermediate layer 254. The alloy layer 256 comprises an alloy of tin and cobalt. Based on the total weight of the layer 256, the alloy layer 256 is preferably comprised of 12 to 28 weight % cobalt with the balance comprising tin. Above 28% cobalt, the alloy layer becomes too hard and overcomes the advantages of the layered structure. More preferably, the alloy layer 256 comprises 20 to 24 weight % cobalt, with the balance comprising tin. Particularly preferred, the alloy layer 256 comprises about 22 weight % cobalt, with the balance comprising tin. The alloy layer 256 may contain some impurities as detailed above for the intermediate layer 254.

The alloy layer 256 preferably has a thickness of between about 0.14 and 0.45 microns. More preferably, the alloy layer 256 has a thickness of between about 0.14 and 0.32 microns. Particularly preferably, the alloy layer has a thickness of about 0.28 microns.

FIG. 3 illustrates a second preferred embodiment of the present invention. This embodiment is identical to the first preferred embodiment except as follows. Like reference numbers in FIG. 3 refer to similar features of the embodiment shown in FIG. 2. As illustrated in FIG. 3, the coating 350 comprises a multilayered structure. In this embodiment, however, the intermediate layer is eliminated. Thus, the alloy layer 356 is deposited directly on the swashplate 111 (or onto the zinc protectant layer 352, if present).

The present invention also provides a method of coating a swashplate. As indicated above, the alloy layer is preferably deposited onto the swashplate by an electroplating technique. The use of electroplating allows for the achievement of higher cobalt concentrations than with other methods, such as chemical conversion. Also preferable, the intermediate layer, if present, is preferably deposited onto the swashplate by an electroplating process.

A preferred method of coating a swashplate in accordance with the present invention comprises the following process. First, an aluminum swashplate is soaked in an alkaline cleanser to remove greases and oils. The soak is preferably carried out at an elevated temperature, such as 165° F., for approximately 0.5 minutes using a non-etch silicated cleaner. A suitable reagent for this step is TS40A from MacDermid Incorporated. Following the soak, the swashplate is rinsed with water at ambient temperature for about five minutes.

Oxide scales are removed from the swashplate by a desmut etching step. For this step, a strong acidic soak is employed. A suitable reagent is TRIACID from MacDermid Incorporated (approximately 50% $H_2SO_4$, 50% $HNO_3$, and 4 oz/gallon Ammonium Bifluoride). The desmut soak is preferably conducted at ambient temperature for one minute.

Following the desmut soak, the swashplate is again rinsed in water. This wash is also conducted preferably at ambient temperature. Also preferable, this rinse is conducted twice, i.e., two consecutive water rinse steps. When two rinses are employed at this step, each rinse preferably lasts approximately 0.5 minutes.

If the zincate protective layer is to be applied to the swashplate, it is preferably applied to the swashplate by a chemical conversion step. For this step, the aluminum swashplate is placed in a bath containing zinc ions. The bath preferably also contains complexers for aluminum ions, which facilitate the deposition of zinc ions onto the swashplate. A suitable solution for this step is BondalCF supplied by MacDermid.

Following application of the zincate protective layer, the swashplate is again rinsed in water at ambient temperature.

If an intermediate layer is to be applied to the swashplate, it is applied preferably through an electroplating process. For this step, the swashplate is placed in an electroplating solution containing tin. The electroplating bath for this step preferably contains divalent tin ions in a low pH (e.g. 0) medium. A suitable bath comprises a tin salt in sulfuric acid with organic brighteners. There should be no other metal ions in the bath solution. Preferably, the tin of the bath comprises bright acid tin. To achieve the preferred thickness of the intermediate layer, electroplating in this step is preferably conducted at about 25° C. at a current density of 20 Amps/square foot for approximately 1.5 minutes. During the electroplating process, the solution and/or swashplate is/are preferably mechanically agitated, such as by shaking or other suitable methods.

Following deposition of the bright tin intermediate layer, the swashplate is again rinsed in water at ambient temperature. This rinse step is preferably conducted three times with each rinse lasting approximately 0.5 minutes.

The alloy layer is applied to the swashplate by an electroplating process. For this step, the swashplate is placed in an electroplating solution containing tin and cobalt. The electroplating bath for this step preferably contains divalent tin and cobalt ions in an alkaline medium, preferably about pH 8.5. A suitable bath comprises tin and cobalt salts, conductivity salts, and organic complexing agents. There should be no other metal ions in the bath solution. A suitable reagent for this step is Chromvet from MacDermid Incorporated. To achieve the preferred thickness of the alloy layer, electroplating in this step is preferably conducted at about 45° C. at a current density of 2 Amps/square foot for approximately 2 minutes. During the electroplating process, the solution and/or swashplate is/are preferably mechanically agitated, such as by shaking or other suitable methods.

After deposition of the alloy layer, the swashplate is preferably dried in hot air. This drying step is preferably conducted for about 1 minute at about 50° C.

The foregoing disclosure is the best mode devised by the inventors for practicing the invention. It is apparent, however, that cobalt-tin swashplate coating alloys incorporating various modifications and variations may be conceivable by a person skilled in the relevant art. Inasmuch as the foregoing disclosure is intended to enable such person to practice the instant invention, it should not be construed to be limited thereby but rather should be construed to include such aforementioned variations and be limited only by the spirit and scope of the following claims.

What is claimed is:

1. A swashplate type compressor, comprising:
   a cylinder block having a cylinder bore and defining a crankshaft chamber;
   a crankshaft rotatably mounted within the cylinder block such that one end of the shaft is disposed in the crankshaft chamber;
   a piston reciprocally disposed within the cylinder bore;
   a swashplate fixedly mounted to the crankshaft and disposed within the crankshaft chamber, the swashplate comprising a matrix composed of aluminum or aluminum alloy and having a sliding region;
   shoes which slidably intervene between the piston and the sliding region of the swashplate such that rotational movement of the swashplate translates to linear reciprocating movement of the piston within the cylinder bore; and
   a coating disposed on the sliding region of the swashplate, the coating comprising an alloy layer of 12 to 28 weight % cobalt and the balance substantially comprising tin.

2. A swashplate type compressor in accordance with claim 1, wherein the alloy layer comprises between 20 and 24 weight % cobalt.

3. A swashplate type compressor in accordance with claim 1, wherein the alloy layer comprises about 22 weight % cobalt.

4. A swashplate type compressor in accordance with claim 1, wherein the alloy layer has a thickness of between about 0.14 and 0.45 microns.

5. A swashplate type compressor in accordance with claim 1, wherein the alloy layer has a thickness of between about 0.14 and 0.32 microns.

6. A swashplate type compressor in accordance with claim 1, wherein the alloy layer has a thickness of about 0.28 microns.

7. A swashplate type compressor in accordance with claim 1, wherein the coating further comprises a base layer disposed on the surface of the swashplate and below the alloy layer.

8. A swashplate type compressor in accordance with claim 7, wherein the base layer comprises a zinc layer having a thickness of about 0.05 and 0.15 microns.

9. A swashplate type compressor in accordance with claim 8, wherein the protectant zinc layer has a thickness of about 0.1 microns.

10. A swashplate type compressor in accordance with claim 7, wherein the coating further comprises an intermediate layer comprising about 100 weight % tin disposed on the base layer and under the alloy layer.

11. A swashplate type compressor in accordance with claim 10, wherein the intermediate layer has a thickness of between about 1.7 and 3.2 microns.

12. A swashplate type compressor in accordance with claim 10, wherein the intermediate layer has a thickness of about 2 microns.

13. A swashplate type compressor comprising:
   a cylinder block having a cylinder bore and defining a crankshaft chamber;
   a crankshaft rotatably mounted within the cylinder block such that one end of the shaft is disposed in the crankshaft chamber;
   a piston reciprocally disposed within the cylinder bore;
   a swashplate fixedly mounted to the crankshaft and disposed within the crankshaft chamber, the swashplate comprising a matrix composed of aluminum or aluminum alloy and having a sliding region;
   shoes which slidably intervene between the piston and the sliding region of the swashplate such that rotational movement of the swashplate translates to linear reciprocating movement of the piston within the cylinder bore; and
   a coating disposed on the sliding region of the swashplate, the coating comprising a base layer of zinc, an intermediate layer of about 100 weight % tin, and an alloy layer of 12 to 28 weight % cobalt and the balance substantially comprising tin.

14. A swashplate type compressor in accordance with claim 13, wherein the alloy layer comprises about 22 weight % cobalt.

15. A method of coating a swashplate for a swashplate type compressor, comprising:
   providing a swashplate composed of aluminum or aluminum alloy;
   removing oils and greases from the swashplate;
   removing oxide scales from the swashplate;
   applying a protectant to the swashplate;
   applying an intermediate layer of about 100% tin to at least a portion of a surface of the swashplate; and
   electroplating a coating comprising an alloy layer of between about 12 and 28 weight % cobalt with the balance substantially comprising tin onto at least a portion of the intermediate layer.

16. The method according to claim 15, further comprising rinsing the swashplate in water.

17. The method according to claim 15, wherein applying the intermediate layer is conducted by electroplating at a current density of about 20 Amps/square foot.

18. The method according to claim 15, wherein electroplating the alloy layer is conducted at a current density of about 2 Amps/square foot.

19. The method according to claim 15, further comprising agitating the swashplate.

20. The method according to claim 15, further comprising drying the swashplate in air.

* * * * *